United States Patent [19]

Strandh

[11] 3,832,895

[45] Sept. 3, 1974

[54] JOYSTICK-TYPE CONTROL WITH STRAIN SENSORS

[75] Inventor: Holger Strandh, Goteborg, Sweden

[73] Assignee: Saab-Scania Aktiebolag, Linkoping, Sweden

[22] Filed: Oct. 16, 1973

[21] Appl. No.: 406,829

[30] Foreign Application Priority Data
Oct. 18, 1972  Sweden.............................. 13411/72

[52] U.S. Cl. ........ 73/133 R, 73/88.5 R, 74/471 XY, 244/83 R, 244/83 E, 338/2
[51] Int. Cl. .............................................. G01l 3/10
[58] Field of Search ............. 244/83 R, 83 D, 83 E; 74/471 XY; 73/88.5 R, 133 R; 338/2, 5

[56] References Cited
UNITED STATES PATENTS

| | | | |
|---|---|---|---|
| 3,440,872 | 4/1969 | Stedman | 338/5 |
| 3,447,766 | 6/1969 | Palfreyman | 74/471 X |
| 3,676,818 | 7/1972 | Oliver | 244/83 E |

Primary Examiner—Trygve M. Blix
Assistant Examiner—Barry L. Kelmachter

[57] ABSTRACT

An actuator movable in a plane parallel to coordinate $x$ and $y$ axes is biased to a normal position by a leaf spring parallel to the $x$ axis and flexible in the $y$ directions. A lever parallel to the $y$ axis has the actuator at one end, a rigid connection to the middle of the leaf spring at the other. The lever is constrained to lengthwise motion and to swinging about said connection. The leaf spring ends are confined to $x$ direction motions. Strain sensors, secured to the leaf spring between its middle and its ends, are connected in bridge circuits that produce outputs respectively corresponding to $x$ and $y$ components of actuator displacement.

3 Claims, 5 Drawing Figures

JOYSTICK-TYPE CONTROL WITH STRAIN SENSORS

This invention relates to joystick-type controls for simultaneously and independently regulating a pair of variable inputs to a machine; and the invention is more specifically concerned with a compact joystick-type control device having an actuator which is movable in all directions in a single plane and which is so connected with strain sensors as to effect tensioning and compression of them in correspondence with displacement of the actuator from a normal position, thus changing an electrical characteristic of the sensors to vary a pair of inputs that the control device regulates.

The joystick type of control is perhaps best known in its application to airplanes, in which it has had extensive use for effecting simultaneous but independent control of elevators and ailerons. Its action is natural and self-explanatory in that any displacement of the stick in a particular direction produces a response by the controlled machine that corresponds in its direction and magnitude to the direction and magnitude of stick displacement. In thus affording logical, facile and accurate control, joystick-type control devices are nicely applicable to many machines wherein reversible motions along two perpendicular axes must be controlled simultaneously and independently of one another.

In an airplane, the joystick usually has a direct connection with the ailerons and elevators whereby air loads on those surfaces are fed back to the stick, tending to hold it in a defined normal or neutral position and endowing it with "feel" by which the pilot can sense the magnitude and direction of its displacement from that position. In many other joystick control applications, however, where the joystick control regulates inputs that are in the nature of electric currents or the like, there is no such feedback bias upon it, and some other biasing expedient must be employed to urge the stick towards a normal or neutral position and afford the desired "feel."

U.S. Pat. No. 3,447,766 to R. D. Palfreyman discloses a prior joystick-type control device wherein displacing forces on the stick effected flexure of a pair of beam-like spring members, and wherein the regulation of a pair of inputs in correspondence with stick displacement forces was effected by means of strain sensors so secured to the spring members as to be responsive to the flexing stresses imposed upon them. The spring members extended lengthwise of the stick, and since there had to be two of them, one for each input to be regulated, they had to be oriented orthogonally to one another. Furthermore, because the spring members extended lengthwise of the stick, with a rigid connecting element between their adjacent ends, the only reasonably compact arrangement that could be achieved with such disposition of the spring members was the one shown in the patent, wherein the spring members were housed in the interior of a hollow sleeve comprising the stick. Such an arrangement was suitable only for a relatively thick and long stick, intended to be grasped with the whole hand and actuated by arm movements. It was not well adapted to a compact miniaturized joystick-type control wherein the stick or actuator is intended to be grasped only with the thumb and two or three fingers, such as might be best suited for the control of a crane or similar machine.

By contrast, it is an object of the present invention to provide a joystick type control device that is well adapted to miniaturization, having the normal or neutral position of its actuator defined by leaf spring means that flex only in one pair of opposite directions so that relatively light displacing forces can be applied to its actuator such as would be exerted through the fingers with mere wrist motion, and wherein strain sensors secured to surfaces of the leaf spring means regulate two inputs to a machine to be controlled in accurate correspondence with displacement of the actuator from its normal position.

Another object of this invention is to provide a joystick-type control device of the character described which has a minimum number of resiliently deformable members for biasing its actuator to the normal position thereof and which affords very accurate correspondence between its actuator displacement and the input signals resulting therefrom, with only negligible hysteresis effects.

Another object of this invention is to provide a joystick control device that can be constructed with substantially any desired "feel," in that the force required to effect a given displacement of the actuator from its normal position can be determined by the stiffness of the particular leaf spring means used for biasing its actuator to its normal position, and wherein said stiffness can, in turn, be readily predetermined by simple calculation or experiment, inasmuch as the biasing force in all directions of actuator displacement depends upon leaf spring means that flex in only one set of opposite directions.

It will be apparent from the last stated object that the joystick-type control device of this invention, although novel in being particularly compact and well adapted for miniaturization, is also well suited to larger control devices having a relatively long and sturdy joystick or lever actuator that is intended to be grasped by the whole hand and actuated by arm movements.

In general, the objects of the invention are achieved by means of a control actuator confined to motion in all directions in a plane that is parallel to a pair of fixed perpendicular axes; a pair of leaf spring elements disposed in end-to-end relationship with their adjacent ends contiguous to one of said axes and their other ends spaced substantial distances to opposite sides thereof, said leaf spring elements being flexible in directions generally parallel to said one axis and having opposite surfaces that face in said directions; a rigid lever having one of its ends connected with the actuator to move in unison therewith and having at its other end means affording a rigid connection to the adjacent end portions of the leaf spring elements; means, such as roller and track means, confining the remote ends of the leaf spring elements to motion in directions substantially lengthwise of those elements and confining the adjacent ends of the leaf spring elements and their connection with the lever to swinging and to motion along said one axis, so that motion of the actuator parallel only to said one axis effects like flexing of both leaf spring elements but actuator motion parallel to the other axis effects a differential flexing of them; and strain sensors secured to said surfaces of the leaf spring elements at locations intermediate their ends.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
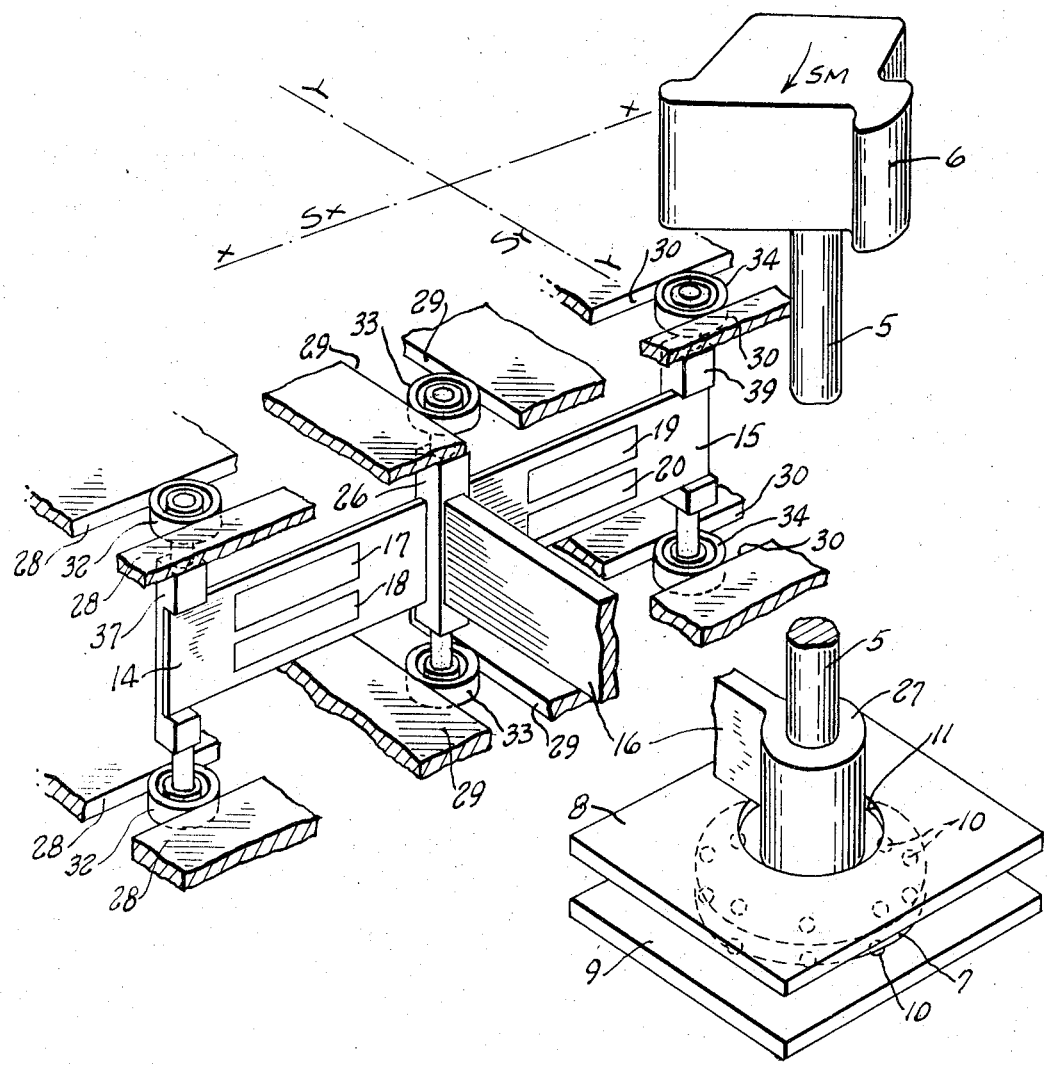
FIG. 1 is a somewhat diagrammatic perspective view, with portions broken away, of a joystick-type control device embodying the principles of the present invention.

Referring now to the accompanying drawings, the numeral 5 designates the actuator of a joystick-type control device, here shown as an upright stick that has at its top a knob-like enlargement 6 which is of a shape and form to be conveniently grasped by the thumb and one or two fingers. The actuator is confined to bodily substantially translatory motion in a plane parallel to a pair of fixed axes $x$ and $y$, but it can move in all directions in that plane, to and from a normal or neutral position to which it is yieldingly biased as explained hereinafter. Thus the actuator can be displaced from its normal position in directions parallel to the axis $x$, or in directions parallel to the axis $y$, or in any direction such as that designated $S_M$ in which its motion is not solely parallel to either axis but can be resolved into a component $S_x$ along the $x$ axis and a component $S_y$ along the $y$ axis.

To confine the actuator to motion in the plane just mentioned, there is fixed to its bottom a ball carrier disc or flange 7 that has a plurality of ball sockets in each of its faces, at spaced intervals all around it. That flange or disc 7 is confined between fixed upper and lower base plates 8 and 9, respectively, which have their opposing faces parallel to the plane containing the axes $x$ and $y$. Balls 10, riding in the ball sockets in the flange 7, rollingly engage the adjacent base plates to cooperate with them and the flange 7 in affording low-friction guiding constraint that confines the actuator to motion as described above.

The upper base plate has a hole 11 therein through which the actuator extends. The diameter of the hole 11 is of course substantially larger than that of the portion of the actuator that extends therethrough, to allow clearance for the required actuator motion; and it will be observed that the diameter of the hole can be so selected in relation to the actuator diameter that the edge of the hole defines desired limits of actuator motion. In most cases the actuator will be in its normal position when it is centered in the hole.

The components that bias the actuator to its normal position and yieldingly resist its displacement out of that position comprise a pair of resilient elongated beam elements 14 and 15, a lever or elongated connecting element 16 that is connected between the actuator and the two beam elements, and certain guide elements which are described hereinafter and which serve to confine the beam elements to particular types of flexing motion. As is also explained below, strain sensors 17–24 are secured to the resilient beam elements to produce a pair of variable inputs for a machine (not shown) to be controlled by the device, which inputs are regulated by the flexing of the beam elements and respectively correspond to the components of displacement of the actuator along the $x$ and $y$ axes.

Considering first the elongated beam elements 14 and 15, these are disposed in end-to-end relation and could comprise two distinct identical members that have their adjacent ends rigidly connected; or, as will probably be preferred in most cases, they can comprise portions of a single long resilient beam. The beam elements have their adjacent ends close to or on the axis $y$ and have their remote ends spaced substantial distances to opposite sides of that axis. As shown, the endwise aligned beam elements, in unflexed condition, extend parallel to the axis $x$.

The beam elements 14 and 15 have their smallest dimension in the direction of the $y$ axis and have substantially wider opposite surfaces that face substantially in the directions of that axis. Thus the beam elements are resiliently flexible in directions parallel to the $y$ axis; and inasmuch as they are thin, normally flat and resiliently flexible, they can be regarded as leaf spring elements or as portions of a single leaf spring.

The connection between the lever 16 and the adjacent ends of the beam elements is shown as comprising a block-like connection member 26. If the beam elements are separate members, they can have their adjacent end portions snugly secured in oppositely opening rabbets in the member 26, or, if they comprise parts of a unitary beam or leaf spring, the same can extend through a snugly fitting slot in the connection member. The adjacent end portion of the lever or connecting element 16 can be similarly received in another snugly fitting rabbet in the connection member 26. Whatever the nature of the connection between the beam elements 14 and 15 and the lever 16, it must be a rigid one that confines them against all motion relative to one another in directions parallel to the plane containing the $x$ and $y$ axes.

The connection between the lever 16 and the actuator 5 is shown as a collar 27 on the end portion of the lever remote from its connection to the beam elements, said collar being illustrated as formed integrally with the lever and snugly embracing a lower portion of the actuator stick, just above the upper base plate 8. Again, the connection between the lever and the actuator can be of any suitable kind, but it must constrain the end of the lever that is remote from the beam elements to partake of all motion of the actuator in the plane parallel to the $x$ and $y$ axes.

It will be obvious that the unflexed condition of the beam elements 14 and 15 defines the normal position of the actuator 5.

Any motion of the actuator out of its normal position imparts flexing to the beam elements by reason of constraints upon motion of those elements that are afforded by rollers 32, 33, 34 that are carried by the beam elements, in their cooperation with guides or tracks 28, 29 and 30 which are fixed in relation to the base plates 8 and 9. Assuming the leaf spring extends lengthwise horizontally and has its broad surfaces oriented vertically, the roller axes extend vertically, substantially in the plane of the leaf spring, and there are sets of the tracks spaced above and below the leaf spring, the set of tracks below it being a duplicate of the set above it and being designated by the same reference numerals. Each set of tracks can be defined by a single horizontal plate, or by a plurality of small horizontal plates fixed in relation to one another, and each track comprises a pair of straight, parallel plate edges that oppose one another to define a slot in which a roller is closely receivable.

At its end opposite the connection member 26 the beam element 14 has secured to it a block-like roller carrier 37 on which are freely rotatably journaled the upper and lower rollers 32 that have guiding engagement with the respective upper and lower tracks 28. A similar roller carrier 39 on the remote end of the beam element 15 similarly carries the freely rotatable rollers 34 that cooperate with the tracks 30.

The block-like connection member 26 has similarly journaled on it the upper and lower rollers 33 that have guiding engagement with the respective tracks 29.

Attention is now directed to the fact that the tracks 28 and 30, which are adjacent to the remote ends of the beam elements 14 and 15, extend generally parallel to the respective beam elements, which is to say that in the illustrated example they are parallel to the axis $x$. However, the tracks 29, which are adjacent to the connection between the beam elements and the lever, extend parallel to the $y$ axis. The tracks 29 thus cooperate with the rollers 33 to confine the connected end portions of the beam elements and the lever to motion parallel to the $y$ axis and to swinging motion of the lever about the coinciding axes of the rollers 33. Of course, any combination of such lengthwise and swinging motions of the lever 16 is also permitted.

Figure 2:
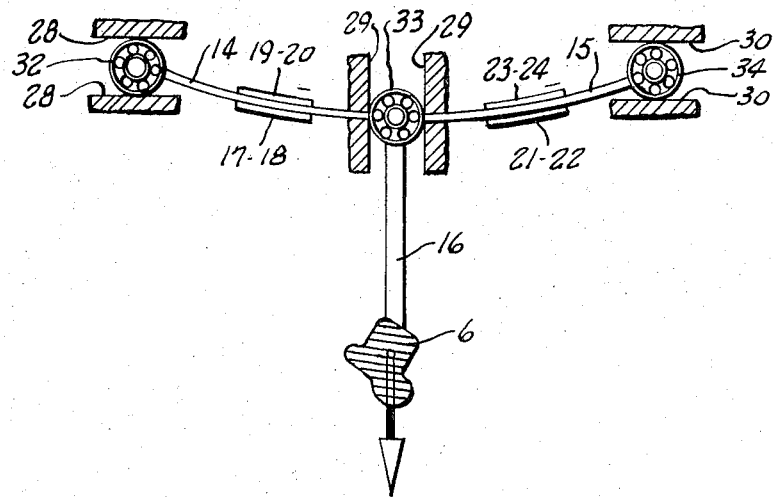
FIG. 2 is a somewhat diagrammatic top plan view of the device, illustrating conditions that obtain upon displacement of the actuator along only one axis.

By reference to FIG. 2 it will be apparent that any force upon the actuator 5 in a direction parallel to the $y$ axis will flex both of the beam elements in the same direction, so that the beam or leaf spring as a whole will be bowed along its length. The resultant foreshortening of the leaf spring is of course accommodated by movement of the remote rollers 32 and 34 along their respective guide tracks 28 and 30. From FIG. 3 it will be apparent that any motion of the actuator parallel to the $x$ axis will result in a swinging of the lever 16 and in a sinusoidal flexing of the beam or leaf spring as a whole, so that the leaf spring elements 14 and 15 will be bowed or flexed in opposite directions. Obviously, any displacement of the actuator simultaneously along both axes will result in a combination of the types of flexures illustrated in FIGS. 2 and 3, so that for every different position of displacement of the actuator there will be a unique condition of flexure of the leaf spring.

The condition of flexure of the leaf spring is detected by the strain sensors 17–24, each of which is a known device that undergoes a change in an electrical characteristic, such as resistance, in response to being subjected to tension or compression, the change in such characteristic corresponding in magnitude and sign to the magnitude and sign of the applied stress. Each strain sensor is secured by a suitable bonding means, such as epoxy adhesive, to one of the broad surfaces of a beam element, at a location thereon intermediate the ends of the beam element. Preferably there are two sensors at each such location and surface of each leaf spring element, or a total of eight sensors. Assuming that the broad surfaces of the leaf spring elements are upright, as shown, the upper sensor of each pair is designated by an odd-numbered reference numeral.

Figure 3:
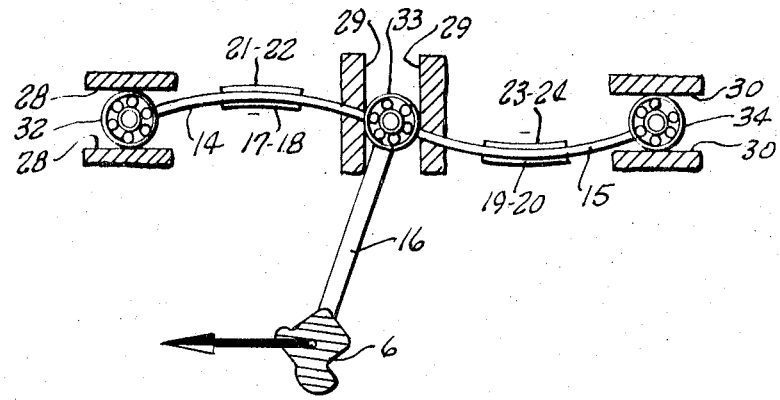
FIG. 3 is a view similar to FIG. 2 but illustrating conditions that obtain when the actuator of the device is displaced only along the other axis.
Figure 4:
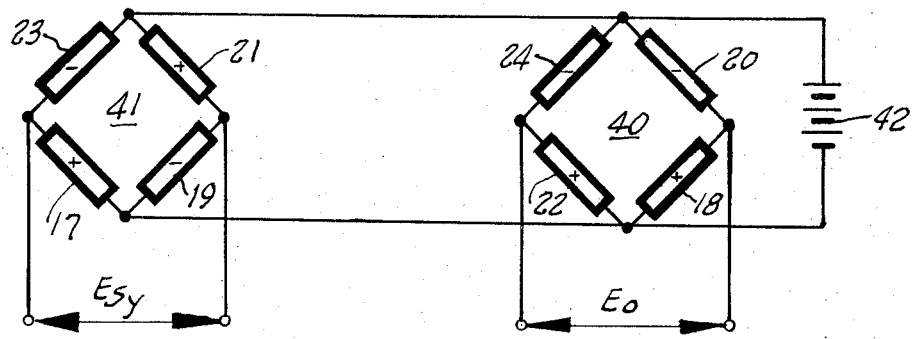
FIG. 4 is a circuit diagram illustrating the outputs obtained from the circuits comprising the several strain sensors, under the conditions illustrated in FIG. 2.
Figure 5:
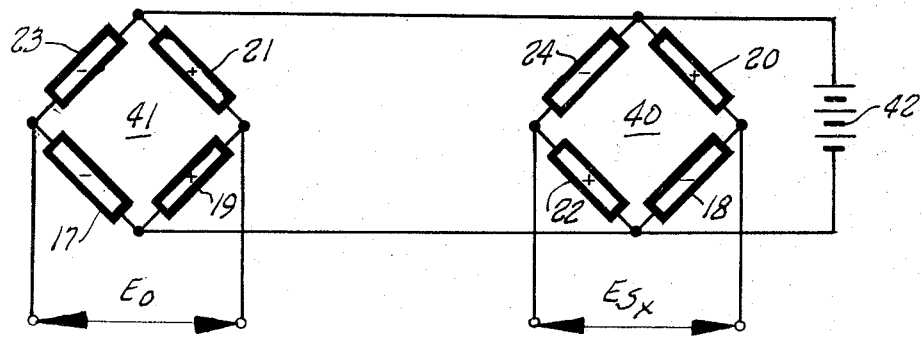
FIG. 5 is a circuit diagram similar to FIG. 4, but illustrating the outputs obtained under the conditions illustrated in FIG. 3.

It will be evident from a consideration of FIGS. 2 and 3 that with the illustrated arrangement any flexing of a leaf spring element will impose tension upon the two sensors on its convexly bowed surface, as denoted by a plus sign, and will impose a substantially equivalent compression upon the two sensors on its concavely bowed surface, as indicated by a minus sign. The sensors can therefore be connected in a pair of bridge circuits 40 and 41 that can be connected with a common current source 42. For convenience, one bridge circuit 40 is shown as including only the upper sensors, while the other bridge circuit 41 includes only the lower ones. Each bridge circuit has its sensors so connected as to be differentially unbalanced by a flexing of the leaf spring that results from displacement of the actuator 5 along one of the axes $x$ and $y$. Thus if the actuator is displaced only along the $y$ axis, as illustrated in FIG. 2, the bridge circuit 41 will have an output $E_{s_y}$ which corresponds in magnitude and sign to such displacement, while the output of bridge circuit 41 will be at a zero or reference level $E_o$. Similarly, any displacement of the actuator solely along the $x$ axis, as illustrated in FIG. 3, will result in a corresponding output $E_{s_x}$ from the bridge circuit 40, while the output of bridge circuit 41 will be at the zero or reference level $E_o$. Obviously a displacement of the actuator simultaneously along both axes will cause the respective outputs of the bridge circuits 40 and 41 to correspond in magnitude and sign to the respective components of such displacement parallel to the $x$ and $y$ axes.

It will be understood that the outputs of the bridge circuits can be employed in any suitable manner as inputs for the control of a machine.

From the foregoing description taken with the accompanying drawings it will be apparent that this invention provides a joystick-type control device that is simple, compact and accurate in its operation.

Those skilled in the art will appreciate that the invention can be embodied in forms other than as herein disclosed for purposes of illustration.

The invention is defined by the following claims:

1. In a control device comprising an actuator which has a normal position and which is manually displaceable therefrom in all directions in a plane parallel to a pair of fixed substantially perpendicular axes to afford regulation of one variable input to a machine to be controlled in correspondence with the component of its displacement along one of said axes and simultaneous but independent regulation of another such input in correspondence with the component of its displacement along the other of said axes, means for translating displacement of said actuator along each of said axes into the corresponding input, said means comprising:

A. a resilient elongated beam normally extending lengthwise parallel to said one axis and flexible in directions parallel to said other axis, said beam having surfaces that face substantially in the last mentioned directions;

B. means connected with each end portion of the beam to confine the same to movement in directions parallel to said one axis;

C. means connected with the medial portion of the beam to confine the same to bodily displacement in directions parallel to said other axis;

D. a substantially rigid lever extending lengthwise substantially parallel to said other axis and having rigid connections at its opposite ends with said actuator and with the medial portion of the beam, respectively, to translate displacement of said actuator along said one axis into sinusoidal flexure of the beam and its displacement along said other axis into bowing flexure of the beam; and E. a plurality of strain sensors, each of a type that undergoes a change in the value of an electrical characteristic in consequence of its tensioning and compression, each of said sensors being secured to one of said surfaces of the beam, at a location between the medial portion of the beam and each end thereof, and the securement of the sensor being such that it partakes of tensioning and compression of said surface with flexing of the beam, so that the relative values of said electrical characteristic of the several strain sensors will at all times correspond to the condition of flexure of the beam and hence to the displacement of the actuator from its normal position.

2. In a control device comprising a manually movable actuator substantially constrained to motion in a plane parallel to a pair of fixed perpendicular axes, to provide for such simultaneous and independent regulation of a pair of variable inputs to a machine that each of said inputs corresponds to the component along one of said axes of the displacement of the actuator from a normal position, means for regulating such inputs in correspondence with such displacements, said means comprising:

A. a pair of elongated leaf spring elements,
1. each having a first end that is adjacent to the first end of the other and to one of said axes and
2. each having a second end that is spaced from said one axis and at the side thereof remote from the second end of the other,
3. each of said leaf spring elements having opposite longitudinal surfaces that face substantially in the directions of the other axis, and
4. each being flexible in said directions;

B. means confining the second end of each leaf spring element to motion in directions substantially lengthwise of the leaf spring element;

C. a lever extending lengthwise substantially parallel to said one axis and having one of its ends connected with the actuator for motion in unison therewith;

D. connection means providing a rigid connection between the other end of the lever and the first ends of the two leaf spring elements, whereby the adjacent first end portions of the leaf spring elements are constrained to partake of all movement of the lever in both its swinging and its endwise translatory modes of motion;

E. means confining said connection means to rotary motion and to endwise motion substantially parallel to said one axis, so that one of said modes of motion of the lever effects flexing of the two leaf spring elements in the same direction and the other effects flexing of them in opposite directions; and F. a plurality of strain sensors, each being of a type that undergoes changes in the value of an electrical characteristic in consequence of its tensioning and compression, each secured on one of said surfaces of a leaf spring element, intermediate the ends thereof, each of said sensors being so secured to its surface as to partake of all elongation and shortening thereof due to flexing of the leaf spring element.

3. The control device of claim 2 wherein there are two of said sensors mounted on each of said surfaces, in laterally adjacent relation to one another, further characterized by:

G. means connecting said sensors in a pair of bridge circuits, with each bridge circuit containing one of said two sensors on each of said surfaces, the sensors of each bridge circuit being exclusive of those of the other so that each bridge circuit can produce an output that corresponds to a component of actuator motion along only one of said axes.

* * * * *